United States Patent [19]

Reum et al.

[11] Patent Number: 4,761,923
[45] Date of Patent: Aug. 9, 1988

[54] LANDSCAPE EDGING

[75] Inventors: Donald J. Reum; Mark T. Reum, both of Albany, Minn.

[73] Assignee: Avon Plastics, Inc., Albany, Minn.

[21] Appl. No.: 894,353

[22] Filed: Aug. 7, 1986

[51] Int. Cl.$^4$ .............................................. E02D 27/00
[52] U.S. Cl. ..................................................... 52/102
[58] Field of Search .................... 52/102, 169.2, 169.3, 52/169.13, 170; 47/33

[56] References Cited

U.S. PATENT DOCUMENTS

| | | | |
|---|---|---|---|
| 2,769,277 | 11/1956 | Keelor | 52/102 X |
| 2,821,809 | 2/1958 | Collier et al. | 47/33 |
| 2,877,600 | 3/1959 | Slate | 47/33 |
| 3,415,013 | 12/1968 | Galbraith | 47/33 X |
| 3,520,082 | 7/1970 | Smith | 52/102 X |

OTHER PUBLICATIONS

"Edg-King", Lawn Edging Publication, distributed by Oly-Ola Sales, Inc., 7-28-81.

Primary Examiner—Carl D. Friedman
Attorney, Agent, or Firm—Merchant, Gould, Smith, Edell, Welter & Schmidt

[57] ABSTRACT

Landscape edging comprising longitudinally joined strips. Each strip comprises a body member, a top rail member on top of the body member and a plurality of first and second nesting regions. The first and second nesting regions of longitudinally adjacent strips are nested with each other to join the strips.

36 Claims, 6 Drawing Sheets

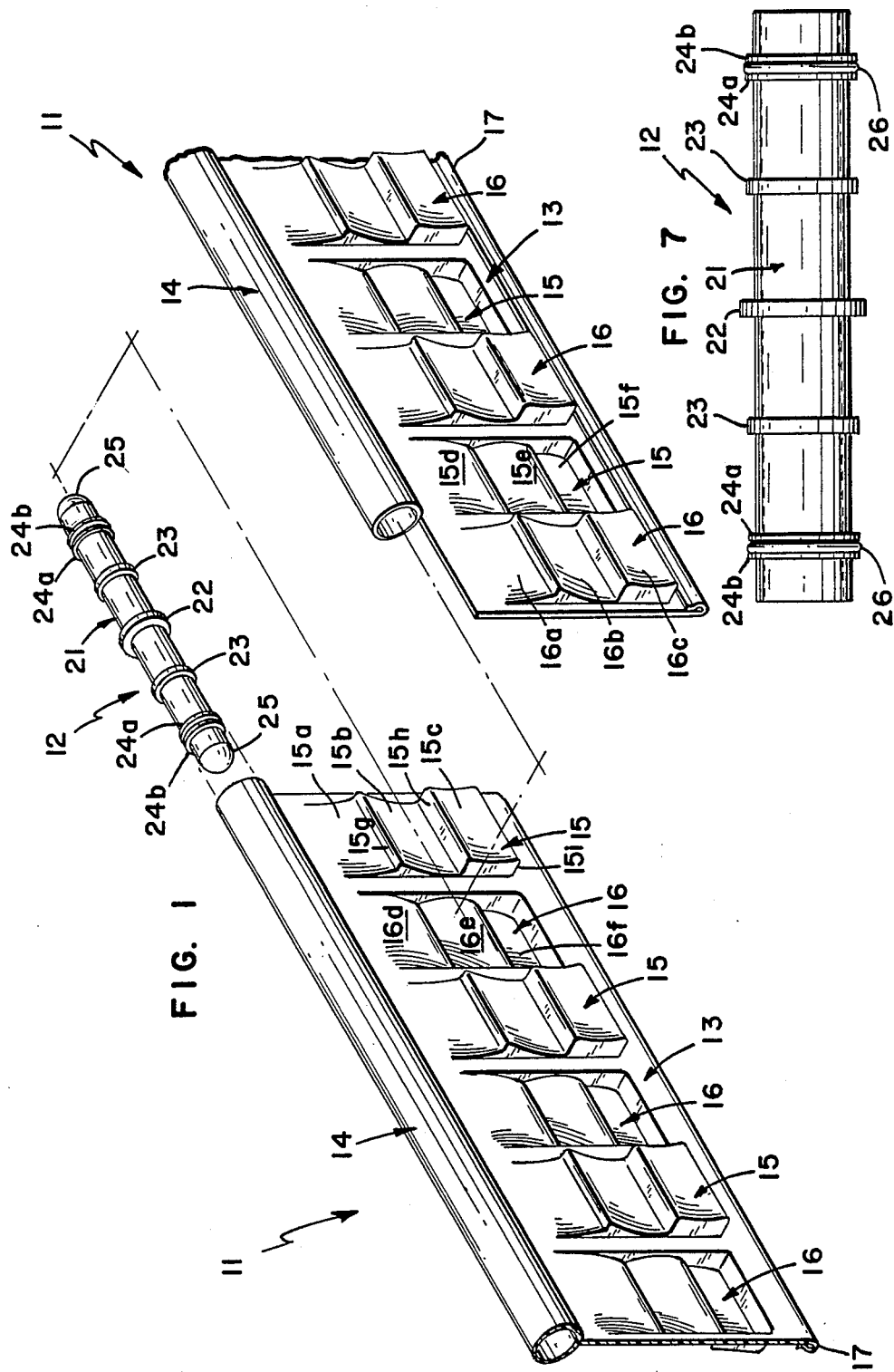

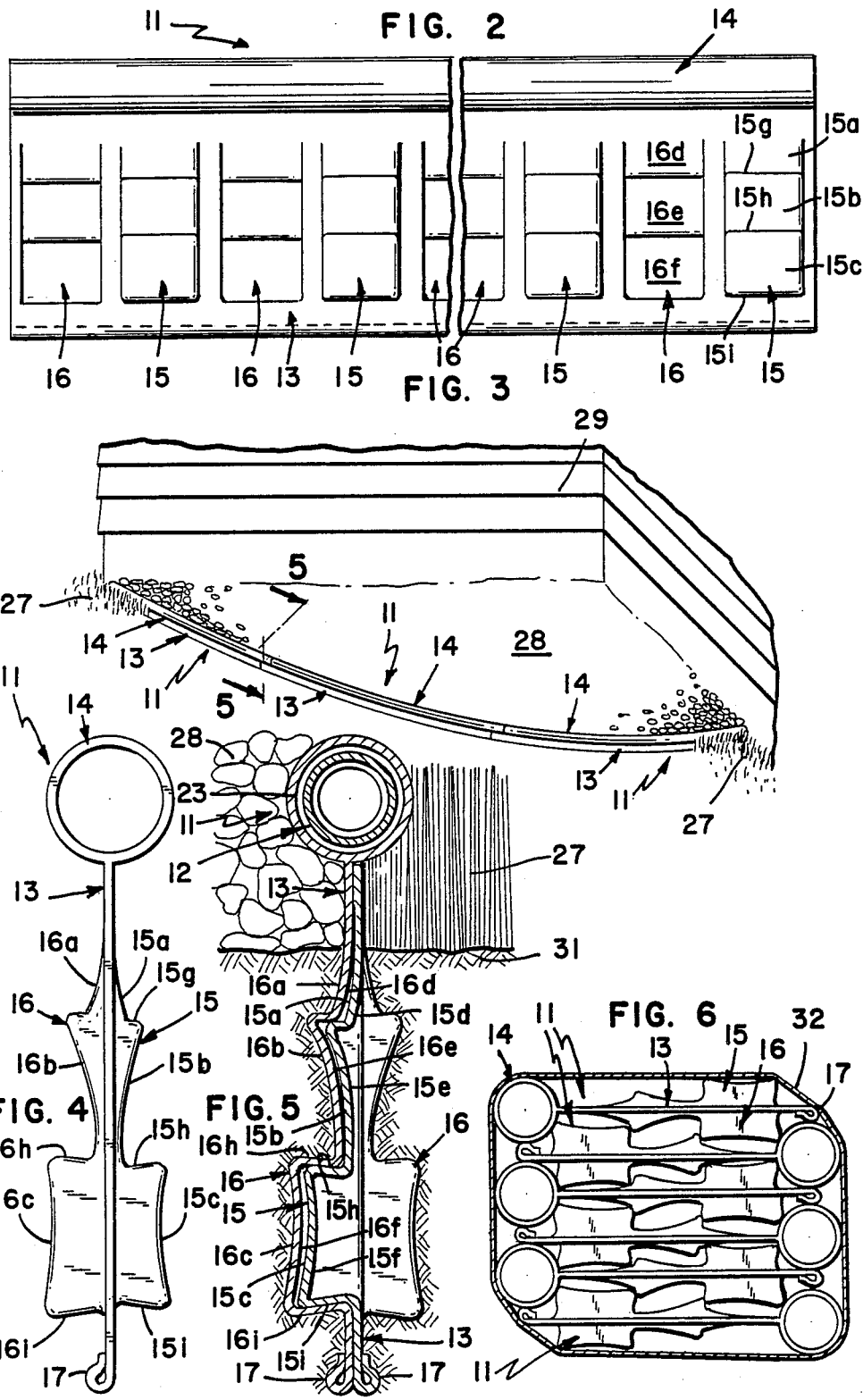

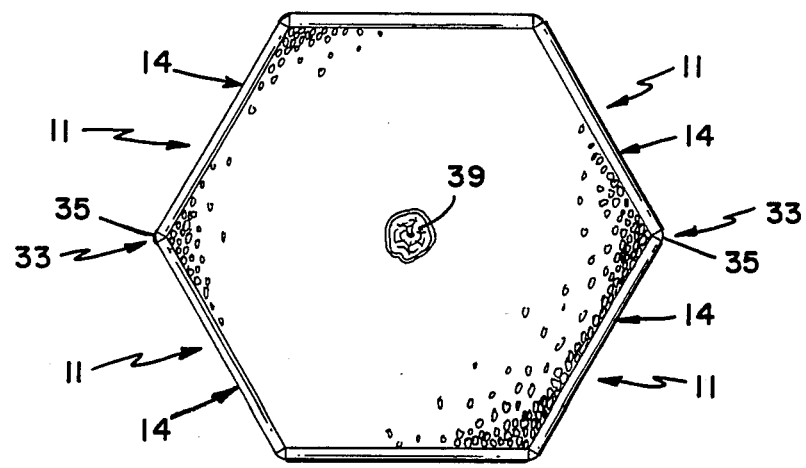
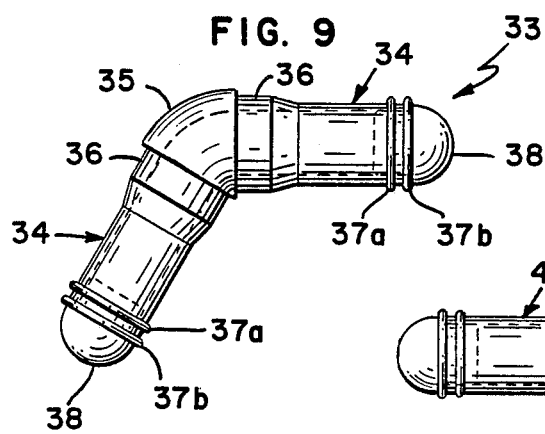
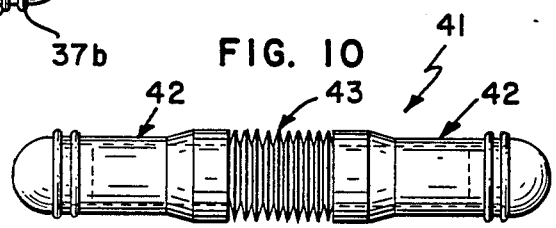
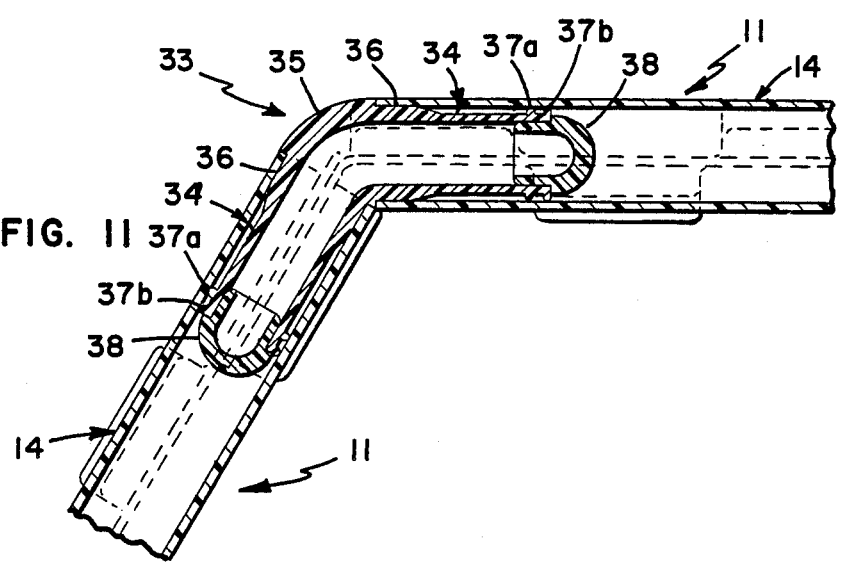

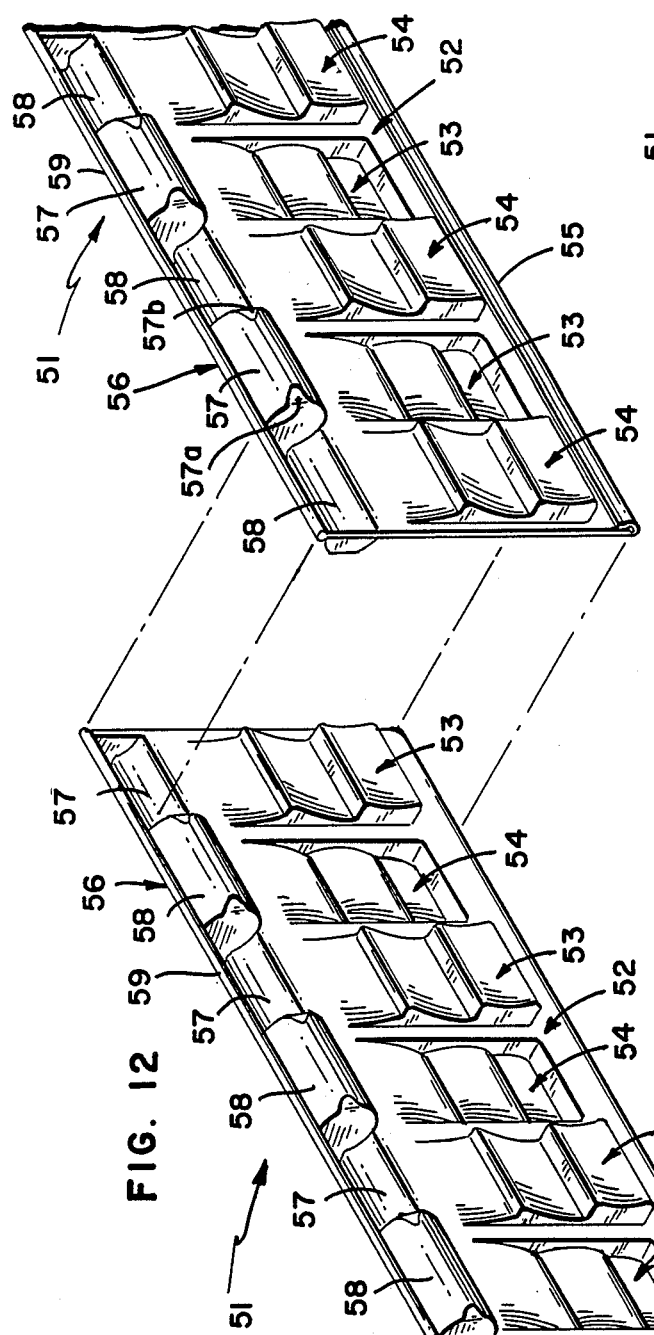
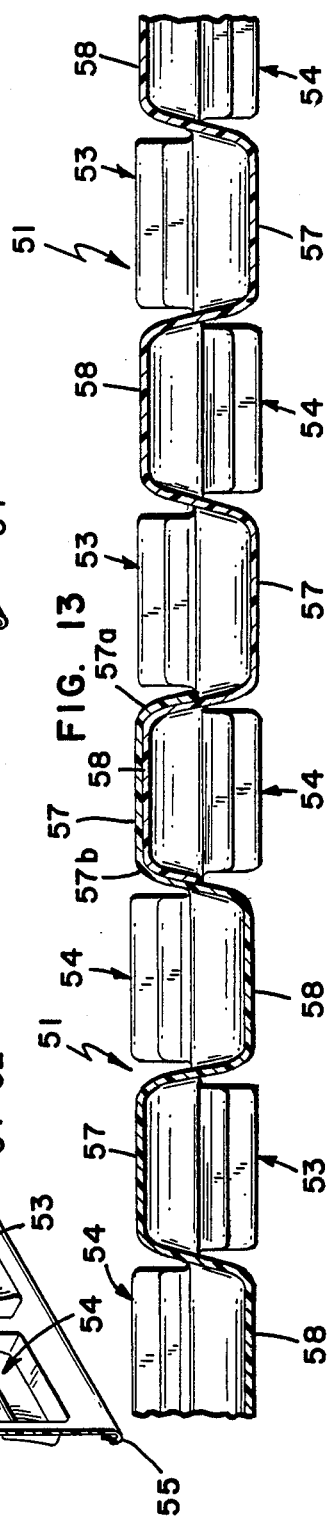

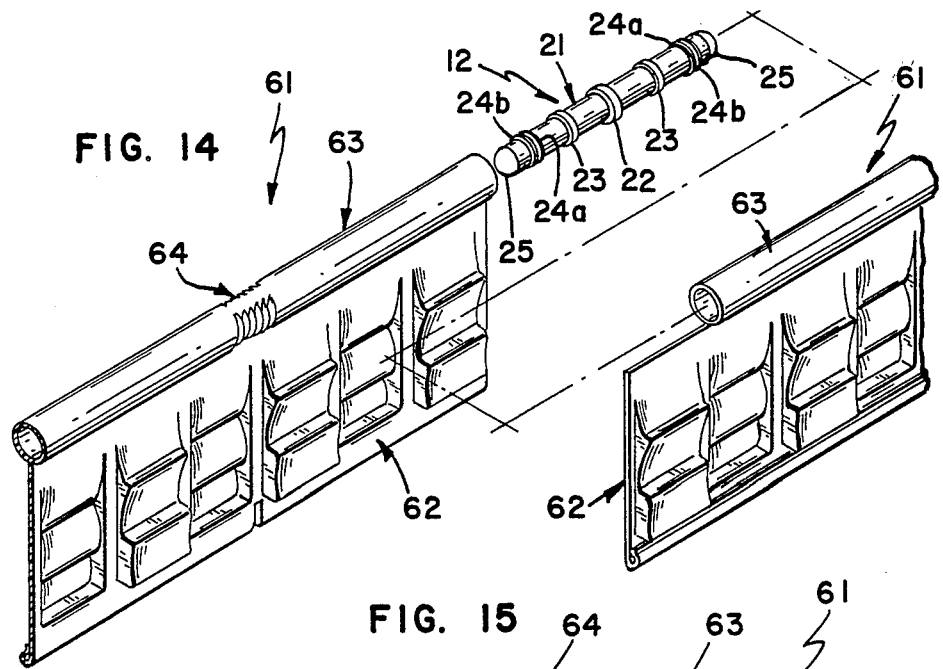
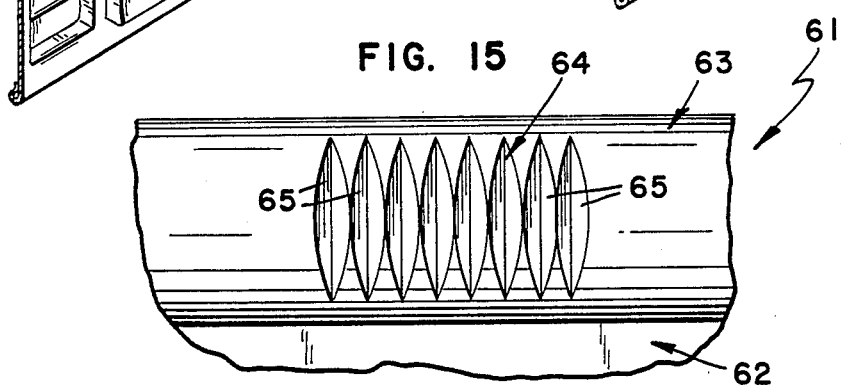
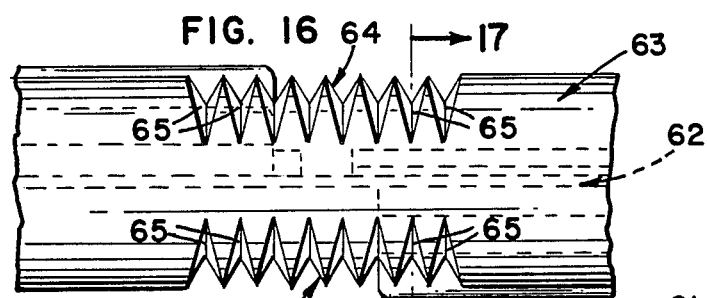
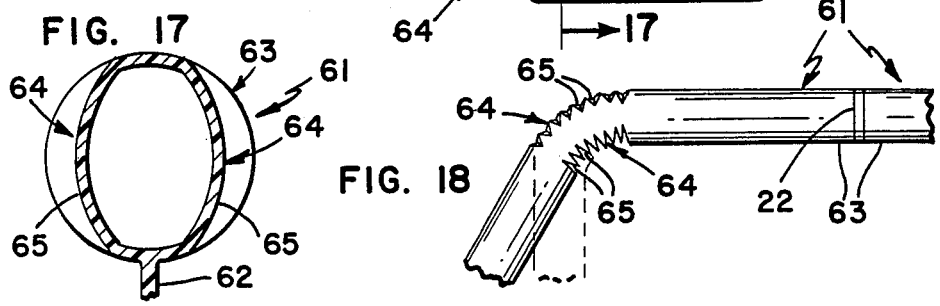

LANDSCAPE EDGING

The invention is directed to landscape edging used as a barrier between landscape areas of different composition.

Landscape edging is now commonly used to divide different landscape areas to preclude one area from spilling or growing into the other. For example, landscape edging is effectively used as a divider between grass and a flower bed to prevent the grass from taking root in the flower bed, and also to prevent bedding material in the flower bed from spilling into the grass.

In the past, landscape edging has been formed from lengths of wood or metal strips, and such materials have served reasonably adequately. However, wood decays over a period of time, and metal has a tendency to rust or otherwise corrode. The most prevalent materials used for landscape edging today are inert synthetic plastics such as polyethylene and ethylene vinyl acetate. These materials are generally flexible and are therefore easily installed, while at the same time having an extended life expectancy that avoids the necessity of replacement at frequent intervals.

However, conventional landscape edging used today is not without faults. First, for economic reasons, much of the commercially available landscape edging is relatively thin and does not have good strength and stability. Landscape edging for professional use is available which is of a heavier grade, but it is somewhat more difficult to use because of stiffness and weight, and it is generally too expensive for use by individual home owners.

Further, it is difficult to connect adjacent lengths of conventional landscape edging whether it is of lighter weight or heavier duty. The edging typically consists of a lower body portion that is tapered or at least thinner along its lower edge to facilitate insertion into the ground, and an upper edge or rail that is somewhat heavier to enhance installation as well as improve its function as a barrier between adjacent landscape areas. The landscape edging is typically sold in coiled lengths, and if more than one coiled length is necessary in a particular application, it must be joined with a further length. To accomplish this, the adjacent ends are disposed in abutting relation, and they are either left without mechanical connection, or some type of clip is used in an effort to mechanically join them.

A problem arises in that these approaches to mechanical connection do not generally work, and the abutting ends often split apart, obviating the intended function of the edging.

Another problem with conventional edging results from ground installation in extreme climates, particularly climates that reach subzero temperatures. Under such conditions, the ground freezes for an extended period of time at least a few inches in depth and up to a foot or more. Because of the moisture content of the soil, the soil expands resulting in frost heave, and this can dislodge the landscape edging to various degrees.

This invention is the result of an endeavor to provide a landscape edging that is easily installed, locks tightly together when additional lengths are necessary and remains firmly anchored in the ground even in extreme climates.

The invention broadly resides in landscape edging comprising a body of predetermined length, height and thickness with a top rail extending longitudinally along the upper edge of the body. The body is provided with a plurality of nesting regions, each of which preferably consists of a plurality of projecting surfaces projecting from one face of the body and a plurality of cavities extending into the opposite face in structural complementing relation to the projecting surfaces. The nesting regions alternate longitudinally of the length of landscape edging and are constructed so that, when one end of one strip is disposed in overlapping relation with another strip, the nesting regions snap together and effectively form a continuous strip.

In one embodiment, the top rail also comprises nesting regions that alternate longitudinally and snap together in essentially the same manner.

In another embodiment, the top rail comprises a tubular conduit that provides two primary functions. First, it enables adjacent lengths of the landscape edging to be secured together through the use of an elongated connector that is commonly inserted into the tubular conduits of adjacent lengths. Thus, the connection between adjacent lengths is not only with the snap-together nesting regions, but also with the connector member joining the adjacent tubular conduits.

Second, the tubular conduit may be used for irrigation purposes for adjacent landscape areas, in which case a plug is used at one end of the overall length of edging and a fluid connector is inserted into the opposite end suitable for connection to a garden hose. The tubular conduit may be drilled or punched to receive suitable drip or spray fixtures.

Both the landscape edging and connectors may be constructed to permit flexure through various angles so that the overall length may follow a landscape bed accurately.

The inventive landscape edging is preferably cut to shorter finite lengths, such as 4 feet, which greatly facilitates its packaging, transport and installation. As constructed, the lengths snap together easily through the use of the nesting regions and connectors. The nesting regions also act to strengthen the lower body, making it far more rigid because of the irregularly configured projecting surfaces and cavities. This mechanical interlocking system serves to hold the edging together even in extreme climates, insuring that the barrier function will be satisfactorily performed. Further, the inclusion of tubular conduit assists in the interconnection, and also enables the landscape edging to be used for irrigation purposes of adjacent landscape areas.

Additional features and advantages of the inventive landscape edging and connectors will be more fully appreciated from the specification and attached drawings.

BRIEF DESCRIPTION OF THE DRAWINGS

FIG. 1 is a fragmentary, exploded perspective view of landscape edging embodying the invention, showing in particular the specific configuration of one embodiment of the edging and a connector for joining two lengths of edging;

FIG. 2 is a fragmentary view in side elevation of the landscape edging of FIG. 1;

FIG. 3 is a fragmentary perspective view showing the inventive edging in exemplary use;

FIG. 4 is an enlarged view in end elevation of the inventive landscape edging;

FIG. 5 is an enlarged view taken along the line 5—5 of FIG. 3, showing in particular the manner of specific connection and use of the inventive landscape edging;

FIG. 6 is a view in end elevation of several lengths of the inventive edging in packaged form;

FIG. 7 is an enlarged view in side elevation of a connector for joining lengths of the landscape edging which has been modified to permit fluid flow;

FIG. 8 is a view in top elevation of another exemplary use of the landscape edging;

FIG. 9 is a view in top elevation of a first alternative embodiment of a connector for joining lengths of the landscape edging at a fixed angle;

FIG. 10 is a view in top elevation of a second alternative embodiment of a connector for joining lengths of the landscape edging at a variable angle;

FIG. 11 is an enlarged fragmentary sectional view of landscape edging joined by the connector of FIG. 9;

FIG. 12 is a fragmentary, exploded perspective view of a first alternative embodiment of the landscape edging;

FIG. 13 is an enlarged fragmentary top sectional view of the landscape edging of FIG. 12;

FIG. 14 is a fragmentary, exploded perspective view of a second alternative embodiment of the inventive landscape edging;

FIG. 15 is an enlarged fragmentary view in side elevation of the landscape edging of FIG. 14, showing in particular the structure for permitting the edging to bend at a desired angle;

FIG. 16 is an enlarged fragmentary view in top plan showing the bending feature of FIG. 15;

FIG. 17 is a fragmentary sectional view taken along the line 17—17 of FIG. 16;

FIG. 18 is a fragmentary view in top plan of the landscape edging of FIG. 14 showing the edging bent at varying angles;

DESCRIPTION OF THE PREFERRED EMBODIMENTS

Figure 19:
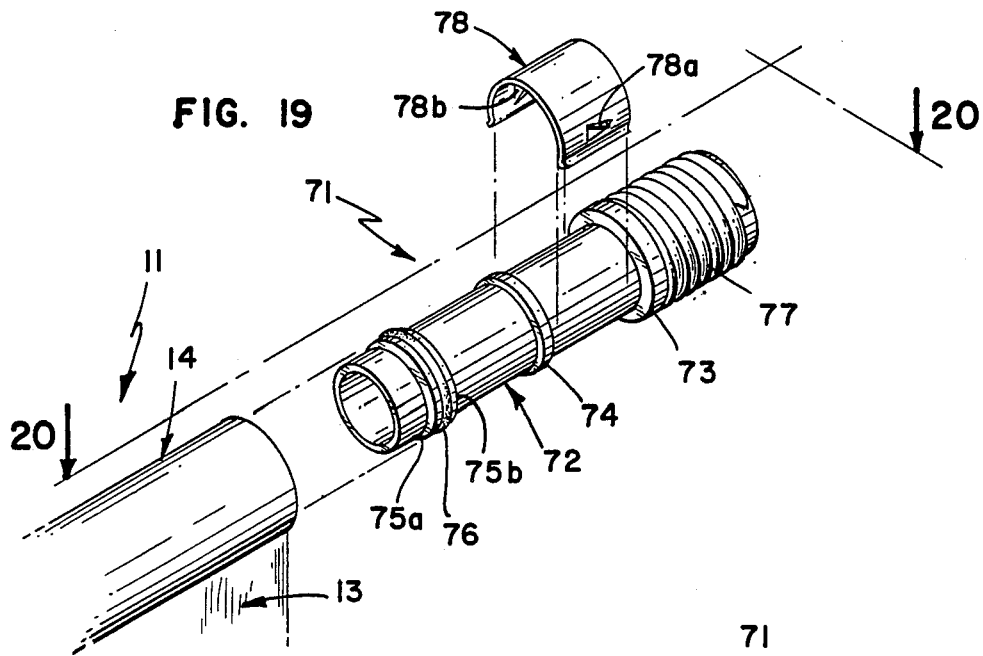
FIG. 19 is an enlarged fragmentary exploded perspective view of a connector for joining one of the lengths of landscape edging to a water conduit such as a hose.

With initial reference to FIGS. 1, 2 and 4, landscape edging embodying the invention is represented generally by numeral 11. Two finite lengths of the edging 11 are shown in FIG. 1, joined by a connector bearing the general reference numeral 12.

Edging 11 comprises a body 13 of predetermined length, height or width and thickness with a top rail 14 extending longitudinally along its upper edge. Body 13 comprises a plurality of nestable regions 15, 16, each of which is generally vertically oriented within the body 13. The nestable regions 15, 16 alternate longitudinally as shown in FIGS. 1 and 2.

Each of the vertically oriented nestable regions 15 comprises three separate projecting surfaces 15a, 15b, 15c of finite longitudinal dimension that are generally of irregular configuration, and which project from one face of the body 13. On the opposite face of body 13, the projections 15a-15c define complementing cavities or recesses 15d, 15e, 15f, also of finite longitudinal dimension. In the preferred embodiment, the projections 15a-15c and cavities 15d-15f are separated by the thickness of the body 13 (see FIG. 5).

With continued reference to FIGS. 1 and 5, the projecting surface 15a comprises a slight ramp surface inclining downward and outward from the first face of body 13 to the projecting surface 15b. An outward step 15g connects the projecting surfaces 15a, 15b, and defines the outermost projection of surface 15b. Projecting surface 15b also generally comprises a ramp surface that inclines downward and inward from this edge of maximum projection, where it joins with an outward step 15h that defines the amount of projection of surface 15c.

Projecting surface 15c is generally rectangular in shape and is slightly concave as shown in FIG. 4. A step 15i similar to step 15h interconnects the surface 15c with the face of body 13. As best shown in FIG. 4, the steps 15h, 15i converge slightly toward each other to define a dovetail configuration.

The sides of each of the projecting surfaces 15a-15c are closed for structural integrity and strength.

The surfaces 15d-15f respectively complement the surfaces 15a-15c and are separated by the thickness of the body member 13.

With continued reference to FIGS. 1, 4 and 5, each of the vertically nestable regions 16 comprises three separate projecting surfaces 16a, 16b, 16c of finite longitudinal dimension projecting from one face of body 13, and three separate cavities or recesses 16d, 16e, 16f of finite longitudinal dimension in the opposite face of the body 13. The projecting surfaces 16a-16c and cavities 16d-16f are of the same configuration as the projecting surfaces and cavities of the nesting region 15, but they are slightly enlarged to permit the projecting surfaces 15a-15c to project into and be nestably received by the cavities 16a-16c, as best shown in FIG. 5. Further, because the steps 15h, 15i and 16h, 16i are slightly convergent, the members snap together and are thereafter retained in this nesting relation. This is facilitated by the wall thickness of these members, which is preferably on the order of 0.065 inches, and the resiliently flexible nature of the material from which the edging 11 is made. The preferred material is broadly from the family of olefins, and specifically is ethylene vinyl acetate.

With continued reference to FIGS. 1, 4 and 5, the lower edge of body 13 is upturned to define a bead 17, which gives the lower edge increased stiffness and stability in anchoring the edging 11 in the ground. It will be noted in FIG. 5 that, when two strips of the edging 11 are nested, the configuration of the nesting regions 15, 16 require one strip to be reversed end for end for nesting to occur, and this also results in the beads 17 of the two strips facing away from each other in order for them to engage properly in a face-to-face relation.

With continued reference to FIGS. 1, 2, 4 and 5, the top rail 14 in this embodiment takes the form of a circular tube that is integrally formed with the body 13 in the plastic extrusion process. The tubular top rail 14 performs several functions. First, it provides stiffness and strength to the upper edge of the edging 11 for strength and stability. Second, it provides an additional means for securely connecting two strips of edging 11 together, as will be discussed in further detail below. Third, the tubular top rail 14 serves as a water conduit, and this permits the edging to perform a drip or spray irrigating function as described in further detail below.

With continued reference to FIG. 1, the connector 12 consists of an elongated tubular body 21 which, based on the plastic material from which it is molded and its wall thickness, is relatively rigid. This material is also preferred to be from the family of olefins, specifically ethylene vinyl acetate. A collar 22 having a diameter corresponding to the diameter of the tubular top rail 14 is centered on the body 21 and acts as a centering stop when the connector 12 is inserted into adjacent tubular top rails 14. Two collars 23 are disposed at an intermediate point between the central collar 22 and each of the ends of the tubular body 21. The outside diameter of the collars 23 is slightly less than the inside diameter of the tubular top rails 14, and the collars 23 thus serve to guide the connector 12 into the tubular guide 14 and to frictionally retain it.

Between each of the collars 23 and the associated end of tubular body 21 are a pair of smaller spaced collars 24a, 24b that define an annular groove therebetween. The outside diameters of the collars 24a, 24b correspond to that of the collars 23, and they serve the same function in establishing a frictionally tight relationship between the connector 12 and the associated tubular rail 14.

Tubular body 21 has plugged ends 25 that are rounded in the preferred embodiment to enhance entry of the connector 12 into the tubular rail 14.

The connector 12 of FIG. 1 is intended for use in a "dry" application; i.e., one in which irrigation by drip or spray is not contemplated.

Although the edging 11 may be cut to relatively long lengths and sold in coils, as is prevalent with existing edging, it is preferably cut to shorter finite lengths (e.g., four feet) which simplifies its installation considerably. In joining two lengths of edging 11, they must first be relatively positioned so that the nesting regions 15 of one strip of edging 11 project in the same direction as the nesting regions 16 from the other edging strip 11, and the projecting surfaces 15a–15c of one can be nestably received into the cavities 16a–16c of the other. Because of the diameter of the top rail 14, this cannot be accomplished without removing a portion of one of the strips, and it is preferable that a length of the tubular rail 14 overlying one of the nesting regions 16 be snipped away as shown in FIG. 1. This enables the end nesting region 15 of one strip to fit into the nesting region 16 of the other, with the tubular top rails 14 disposed in coaxial alignment.

Before joining the strips of edging 11, the connector 12 must first be introduced into one of the tubular rails 14, with the central collar 22 abutting the end of the rail 14. The opposite end of the connector 12 is then inserted into the tubular rail 14 of the other strip of edging 11 until the collar 22 abuts the rail 14. The respective bodies 13 are rotatably spread apart during this insertion, and with the connector 12 fully inserted into both tubular top rails 14, the bodies 13 are moved together, and the projecting surfaces 15a–15c are inserted into the cavities 16a–16c and snapped together.

FIGS. 3 and 5 show an exemplary application of three lengths of the edging 11 joined together in an arcuate line to divide a grassy area 27 from an area of aggregate 28 (which may include landscaping plants not shown) in the inside corner of a house 29. With specific reference to FIG. 5, it will be seen that the lower portion of the body 13 including the nesting regions 15, 16 is inserted into earth 31 below ground level, and the upper portion of the body 13 and the top rail 14 extend above ground level a predetermined amount. In this particular case, the top of top rail 14 is at essentially the same level as the top of the aggregate 28 and grass 27. As such, the edging 11 acts as an effective barrier between the grass 27 and aggregate 28, while at the same time permitting the grass 27 to be mowed without injury to or interference from the edging 11.

The unique construction of the nesting regions 15, 16 not only enables the overlapping lengths of edging 11 to be connected in a snapping engagement, but also, due to their configuration, to provide anchoring to each strip 11 below the ground as well as strength and stability at all times. In particular, in northern climates where the ground freezes, it is not unusual for landscape edging to be moved or even damaged due to frost heave, and the edging 11 significantly diminishes these problems.

FIG. 6 shows a preferred form of packaging the finite lengths of landscape edging 11. Because of the size and configuration of the top rail 14 and nesting regions 15, 16, it is possible to arrange the strips 11 in an alternately reversed manner as shown in FIG. 6, enabling them to stack neatly in a generally rectangular form. The strips 11 can be packaged neatly and efficiently through the use of a sheet 32 of polyethylene that is shrink wrapped around the stacked arrangement. In this particular embodiment, the package contains six lengths of edging 11 each of which is four feet in length for a total of 24 feet. The elongated, generally rectangular package is much more easily transported, displayed and sold than the conventional approach of coiling a like amount, which is then packaged in a corrugated box having a hole in the middle of the package.

With reference to FIG. 7, a connector 12 is shown which is identical to the connector shown in FIG. 1, with two exceptions. First, the ends 25 are clipped off to permit the connector 12 to be used to conduct water. Second, to provide an effective seal, O-rings 26 are placed in the annular grooves between collars 24a, 24b. The O-rings 26 have an outside diameter that is slightly greater than the inside diameter of top rails 14, and with insertion of the connector 12 into the tubular rails 14 an effective water seal is accomplished. The O-rings 26 may be greased slightly to simplify insertion as well as to provide a better long-range seal.

A number of kits are commercially available that permit the edging 11 to be used for dripping or spraying water into adjacent areas. This necessitates drilling or punching small holes in desired locations in the tubular top rail 14 with insertion of these commercially available fixtures to permit water to be dripped or sprayed in appropriate amounts and in proper directions.

When the edging 11 is used in an irrigating manner, one end of the total length must be plugged by means not shown (a modified connector 12 may be used for this purpose), and a fluid coupling for connecting to a garden hose or the like must be used at the opposite end. Such a coupling is described in further detail below.

With reference to FIGS. 8, 9 and 11, an alternative connector is represented generally by the numeral 33. Connector 33 is molded from plastic, and includes two body sections 34 disposed at a 135° angle and joined together at a central collar 35. Each of the bodies 35 includes a stepped region 36 the outside diameter of which permits it to frictionally engage the inside diameter of the tubular rail 14. Each of the bodies 34 also includes spaced collars 37a and a rounded closed end 38. As constructed, the connector 33 may be used in either a dry application or as a water conduit-connector in the same manner as connector 12. However, connector 33 permits landscape edging strips 11 to be joined at a fixed angle as shown in FIG. 8 in, for example, surrounding relation to a tree 39.

FIG. 11 shows the connector 33 inserted into adjacent tubular rails 14 of landscape edging 11. The collar 35 defines an arcuate segment the external dimensions of which correspond to the outside diameter of tubular rail 14. The steps 36 and collars 37a, 37b frictionally engage the inner diameter of tubular rail 14. With the ends 38 removed and an O-ring added at each end, the connector is suitable for use as a water conduit.

With reference to FIG. 10, a second alternative embodiment of an edging connector is represented generally by the numeral 41. Connector 41 includes body segments 42 substantially identical to those of connector 33, but joined together by a bellows section 43 constructed to permit flexure of one body segment 42 relative to the other at any desired angle. Accordingly, strips of landscape edging 11 may be oriented relative to each other at any desired angle for a variety of configurations.

With reference to FIGS. 12 and 13, an alternative embodiment of the inventive landscape edging is represented generally by the numeral 51. Edging 51 has a body 52 that is in all respects the same as that of body 13 of edging 11, including identical nesting regions 53, 54 and a bead 55 along the lower edge.

Edging 51 is different than edging 11 in that a top rail 56 itself includes longitudinally alternating nesting regions 57, 58 and a longitudinal bead 59 along its upper edge. Each of the nesting regions 57 projects from one face of the edging 51, and the nesting regions 58 project from the opposite face thereof. Each nesting region 57, 58 thus consists of a projecting surface on one side that is generally cylindrical in shape with a complementing cavity on the opposed side. These projecting surfaces are slightly tapered at each end, as shown for example at 57a and 57b, to facilitate entry into the receiving cavity.

The nesting region 57 is necessarily larger than the nesting region 58, so that the receiving cavity of the former can nestably receive the projecting surface of the latter.

As is evident from the exploded perspective view of FIG. 12, two of the landscape edging strips 51 may be joined by reversing one of the strips end for end, aligning the nesting portions 53 and 57 of one strip with the nesting portions 54, 58 with the other, and pressing the two together. It will be observed that the projecting surfaces of the nesting regions 57 are on the opposite face of the strip from the projections of nesting regions 53, and the same holds true for nesting regions 58 and 54. This provides additional strength and stability to maintain the lengths of edging 51 in a permanent position under the ground.

With reference to FIG. 14, a second alternative embodiment of the inventive landscape edging is represented generally by the numeral 61. Edging 61 has a body 62 that is identical to that of edging 11 and 51, and it further includes a top rail 63 that is identical to the tubular top rail 14 of edging 11 with one exception; viz., a bellows section 64 is disposed at a point intermediate its ends. With reference to FIGS. 15-17, the bellows section 64 comprises a plurality of vertically extending channels or grooves formed in opposite sides of the tubular rail 63 in longitudinal, side-by-side relation. Because only lateral flexibility of the edging 61 is desired, it is not necessary for the grooves 65 to be disposed in other than the sides of the tubular rail 63, although this is possible. However, with the construction of bellows section 64 disclosed, the internal conduit of tubular rail 63 is restricted to a lesser extent, as shown in FIG. 17.

The material of edging 61, the thickness of the wall of tubular rail 63, and the size and number of the individual grooves 65 are chosen to permit flexure of the edging 61 into various angles, as shown in FIG. 18. Additional flexibility may be obtained by including a plurality of bellows sections 64 in a given unit length of the edging 61.

Figure 20:
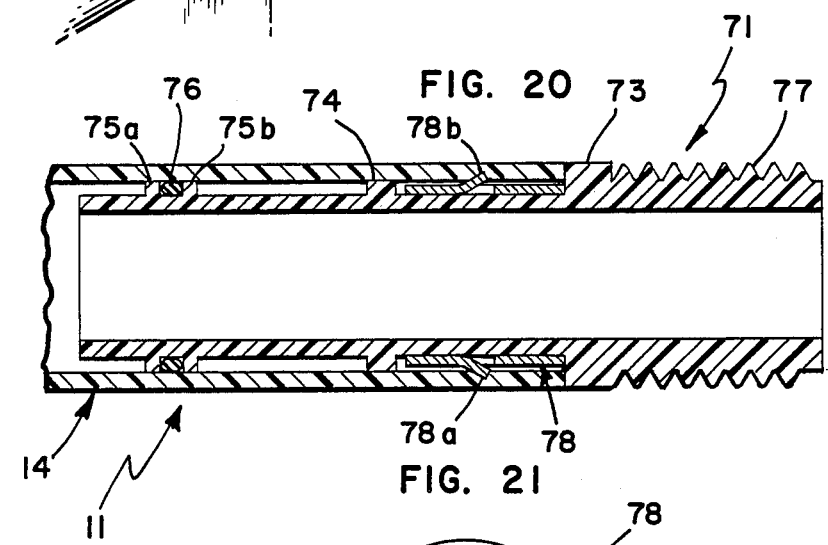
FIG. 20 is an enlarged fragmentary sectional view taken along the line 20—20 of FIG. 19.
Figure 21:
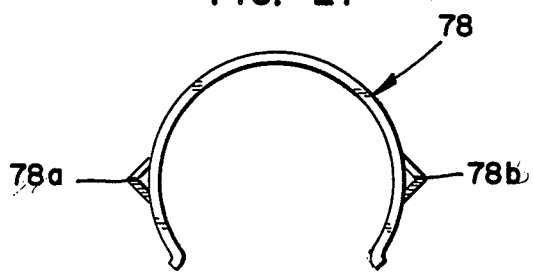
FIG. 21 is a further enlarged view in end elevation of a spring clip used with the connector of FIG. 19 for irreversibly positioning the connector in the edging.

With reference to FIGS. 19-21, a fluid coupler for the inventive landscape edging capable of modification for drip or spray irrigation purposes is represented generally by the numeral 71. Coupling 71 is structurally similar to coupling 12 in part, including a body 72 that is generally cylindrical in construction with a central collar 73 corresponding in diameter to the outside diameter of tubular rail 14. Body 72 further comprises an intermediate collar 74 spaced from the central collar 73 a predetermined distance, and a pair of smaller collars 75a, 75b defining an annular space therebetween to receive an O-ring 76. The ends of coupling 71 are open to permit it to conduct water.

On the side opposite central collar 73, fluid coupling 71 is formed with a male threaded member 77, the size and threads of which are chosen for connection with a conventional garden hose. A female threaded member may be provided instead of the male threaded member 77 depending on the desired application.

Disposed in the space between the central and intermediate collars 73, 74 is a spring clip 78 the circumference of which is greater than one-half the circumference of the body 72, and the length of which is chosen to fit snugly between the collars 73, 74. Spring clip 78 is preferably formed from spring steel or a suitable plastic equivalent, enabling it to snap fit over the body 72 and to be held in place by its inherent resilience.

Spring clip 78 is formed with a pair of barbs 78a, 78b which, in the preferred embodiment, are diametrically opposed and project radially outward. The barbs 78a, 78b are also inclined outwardly toward the threaded member 77, and as constructed function to engage the inner surface of tubular conduit 14 and irreversibly hold the fluid coupling 71 when inserted into the tubular rail 14, as best shown in FIG. 20.

The spring clip 78 is also sized for use with any of the connectors 12, 33 or 41 by placing it between spaced collars on the connector body.

The fluid connector 71 is intended for use with a system of edging involving several lengths which have been provided with spaced drip or spray holes. Such a system requires either a plug in the end of the conduit opposite the connector 71, or another fluid connector 71 that is adapted for connection to yet another system. In this regard, the male threaded member 77 is preferred because a female coupling from a garden hose is freely rotatable and more easily attached. However, it is within the scope of the invention for the fluid coupling 71 to have a female threaded member as well.

Operation of the several embodiments of the landscape edging, connectors and couplings may be understood from the foregoing description. As with conventional landscape edging, installation requires a narrow trench or temporary separation of earth, grass, aggregate or the like to a predetermined depth to permit insertion of the edging to the necessary depth with the various nesting regions disposed below the soil, with a portion of the edging and upper rail disposed above ground level. Installed in this manner, the inventive landscape edging provides an excellent barrier between landscape areas of different composition (e.g., grass and aggregate), while being firmly anchored in the ground with the several lengths of edging mechanically secured in overlapping relation. The result is a landscape edging system that will remain in place over long periods of time without becoming unanchored or disconnected under normal environmental conditions, including extremely cold winters.

What is claimed is:

1. Landscape edging, comprising:
   a body member of predetermined length, height and thickness and defining first and second opposed faces;
   a top rail member extending longitudinally along the top of the body member;
   a plurality of first nesting regions formed in the body and disposed in longitudinally spaced relation, each of said first nesting regions comprising at least one projecting surface projecting from the first face of said body and at least one cavity extending into the second face of said body;
   a plurality of second nesting regions formed in the body and disposed in longitudinally spaced alternating relation with the plurality of first nesting regions, each of said second nesting regions comprising at least one projection surface projecting from the second face of said body and at least one cavity extending into the first face of said body;
   the projecting surface of the first nesting regions and the cavities of the second nesting regions being structurally complementary to permit two lengths of the landscape edging to be joined in longitudinal overlapping, nesting relation.

2. The edging defined by claim 1, wherein each nesting region comprises a plurality of projecting surfaces and a like plurality of cavities.

3. The apparatus defined by claim 2, wherein each nesting region comprises first, second and third projecting surfaces and cavities of different structural configuration and disposed in vertical relation.

4. The edging defined by claim 3, wherein the first projecting surface comprises a ramp-like surface inclining downward and outward relative to the associated face, the second projecting surface comprises a ramp-like surface inclining downward and inward relative to the associated face, and the third projecting surface comprises a generally rectangular surface with dovetailed sides.

5. The edging defined by claim 3 or 4, wherein the first projecting surface is disposed adjacent the rail member, the third projecting surface is disposed adjacent the bottom edge of the body member, and the second projecting surface is disposed between the first and second projecting surfaces.

6. The edging defined by claim 1, wherein each cavity extends into the associated projecting surface and is separated therefrom by the thickness of said body.

7. The edging defined by claim 1, wherein the bottom edge of the body member comprises a longitudinal bead.

8. The edging defined by claim 1, wherein the top rail comprises a tubular conduit.

9. The edging defined by claim 8, which further comprises connector means insertable into said tubular conduit.

10. The edging defined by claim 9, wherein the tubular conduit is circular in cross section, and the connector means comprises an elongated member of circular cross section dimensioned to fit frictionally into said tubular conduit.

11. The edging defined by claim 10, wherein the elongated member is closed at each end and constructed for common insertion into the tubular conduits of adjacent lengths of said edging to join said lengths.

12. The edging defined by claim 10, wherein the elongated member is open at each end and constructed for common insertion into the tubular conduits of adjacent lengths of said edging to join said lengths and to establish fluid communication therebetween.

13. The edging defined by claim 11 or 12, wherein the elongated member further comprises a centrally disposed collar having a diameter greater than the inside diameter of said tubular conduit.

14. The edging defined by claim 12, wherein the elongated member further comprises seal means at each end.

15. The edging defined by claim 14, wherein each seal means comprises a pair of spaced collars formed on said elongated body and an O-ring disposed therebetween.

16. The edging defined by claim 10, which further comprises retention means for mechanically retaining the elongated member in the associated tubular conduit.

17. The edging defined by claim 16, wherein the retention means comprises a spring clip sized to fit over the elongated member and comprising a plurality of barbs engagable with the inner surface of the tubular conduit.

18. The edging defined by claim 10, wherein said elongated member comprises first and second segments formed at a fixed relative angle to permit connection of adjacent lengths of said edging at said angle.

19. The edging defined by claim 10, wherein the connector means is formed from an olefin.

20. The edging defined by claim 19, wherein the olefin is ethylene vinyl acetate.

21. The edging defined by claim 9, wherein the connector means comprises structural means for permitting it to flex to various angular positions.

22. The edging defined by claim 21, wherein the structural means comprises bellows means.

23. The edging defined by claim 8, wherein the connector means is constructed and arranged for connecting said tubular conduit to a source of water.

24. The edging defined by claim 23, wherein the coupling means comprises an elongated member one end of which is open and constucted for sealable insertion into said tubular conduit, and the other end of which is open and comprises threaded means for a threadable connection with a water source such as a garden hose.

25. The edging defined by claim 1, wherein the top rail comprises a plurality of third and fourth structurally complementary nesting regions disposed in longitudinally alternating relation.

26. The edging defined by claim 25, wherein the third and fourth nesting regions are disposed in aligned relationship with the first and second nesting regions, respectively.

27. The edging defined by claim 26, wherein the third nesting region comprises a projecting surface projecting from the second face of said body and a cavity extending into the first face of said body, and the fourth nesting region comprises a projecting surface projecting from the first face of said body and a cavity extending into the second face of said body.

28. The edging defined by claim 1, wherein the top rail comprises structural means for permitting said rail to flex to varying angular positions.

29. The edging defined by claim 28, wherein the structural means comprises bellows means.

30. The edging defined by claim 1, wherein the body and rail members are integrally formed.

31. The edging defined by claim 30, wherein the landscape edging is formed from an olefin.

32. The edging defined by claim 31, wherein the olefin is ethylene vinyl acetate.

33. In landscape edging including an elongated strip of material having a predetermined length, height and thickness with opposed first and second faces, the strip being adapted for partial insertion into the ground with first and second longitudinal portions lying above and below the ground, respectively, the improvement which comprises a plurality of separate projecting surfaces formed in the second longitudinal portion of the strip, each projecting surface having a finite longitudinal dimension, and a plurality of separate cavities formed in the second longitudinal portion of the strip, each cavity having a finite longitudinal dimension and structurally complementing one of said projecting surfaces, the projecting surfaces and cavities being constructed and disposed so that two elongated strips of the landscape edging may be joined in longitudinal overlapping relation with one projecting surface of one strip nestably projecting into a cavity of the other strip.

34. In landscape edging including an elongated strip of material having a predetermined length, height and thickness with opposed first and second longitudinal faces, the strip being adapted for partial insertion into the ground with first and second longitudinal portions lying above and blow the ground, respectively, the improvement which comprises projection means projecting from the second longitudinal portion of one of said first and second faces, and recess means formed in the second longitudinal portion of the other of said first and second faces, said projection means and recess means being constructed and arranged to interlockably snap together when the longitudinal faces of two separate strips are brought together.

35. The landscape edging defined by claim 34, wherein the projection means comprises a plurality of projections projecting from the second longitudinal portion of said one longitudinal face, and the recess means comprises a plurality of recesses formed in the second longitudinal portion of said other longitudinal face, the projections and recesses being respectively spaced so that a plurality thereof can interlockably snap together when the longitudinal faces of two separate strips are brought together.

36. The landscape edging defined by claim 34, wherein the improvement further comprises recess means formed in the second longitudinal portion of said one longitudinal face, and projection means projecting from the second longitudinal portion of said other longitudinal face, the respective projection means and recess means being constructed and disposed to permit them to interlockably snap together when the longitudinal faces of two separate strips are brought together.

* * * * *